United States Patent
Friman

(10) Patent No.: US 7,096,031 B1
(45) Date of Patent: *Aug. 22, 2006

(54) METHOD FOR CONTROLLING A TRANSCODER OF A MOBILE COMMUNICATION SYSTEM

(75) Inventor: Leif Friman, Järvenpää (FI)

(73) Assignee: Nokia Networks Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 09/554,407

(22) PCT Filed: Nov. 11, 1998

(86) PCT No.: PCT/FI98/00878

§ 371 (c)(1),
(2), (4) Date: May 12, 2000

(87) PCT Pub. No.: WO99/26435

PCT Pub. Date: May 27, 1999

(30) Foreign Application Priority Data

Nov. 13, 1997 (FI) ...................................... 974223

(51) Int. Cl.
*H04B 7/01* (2006.01)
*H04Q 7/20* (2006.01)

(52) U.S. Cl. .................. 455/502; 455/442; 455/445
(58) Field of Classification Search ................ 455/442, 455/422, 436, 502, 437, 438, 443, 444, 445, 455/560, 422.1; 370/328, 338, 337, 331, 370/335, 324; 375/140; 704/221, 220, 222, 704/223, 229, 230

See application file for complete search history.

(56) References Cited

U.S. PATENT DOCUMENTS

| 5,383,221 | A | * | 1/1995 | Akita et al. ..................... 375/7 |
| 5,612,992 | A | | 3/1997 | Dupuy et al. |
| 5,661,724 | A | | 8/1997 | Chennakeshu et al. |
| 5,722,074 | A | * | 2/1998 | Muszynski ................... 455/442 |
| 6,035,179 | A | * | 3/2000 | Virtanen ....................... 455/63 |
| 6,061,566 | A | * | 5/2000 | Friman ........................ 455/445 |
| 6,125,120 | A | * | 9/2000 | Lehtimaki ................... 370/435 |
| 6,308,063 | B1 | * | 10/2001 | Koistinen et al. ........... 455/422 |

FOREIGN PATENT DOCUMENTS

| EP | 637 179 | 2/1995 |
| FR | 2 700 088 | 7/1994 |
| WO | WO 95/01072 | 1/1995 |

* cited by examiner

*Primary Examiner*—Naghmeh Mehrpour
(74) *Attorney, Agent, or Firm*—Pillsbury Winthrop Shaw Pittman LLP

(57) ABSTRACT

A mobile communication system includes a mobile services switching center, a base station and a transcoder. The transcoder receives frames containing speech parameters from the base station and receives speech signals from the mobile services switching center which it encodes into speech parameters to be transmitted to the base station in the frames. To enable the cooperation between the transcoder and the base station to be controlled as simply as possible, the mobile communication system includes a controller for transmitting predetermined control information to the base station, whereby the base station is arranged to control the operation of the transcoder via the telecommunication connection in response to the reception of the control information.

6 Claims, 2 Drawing Sheets

Figure 1:
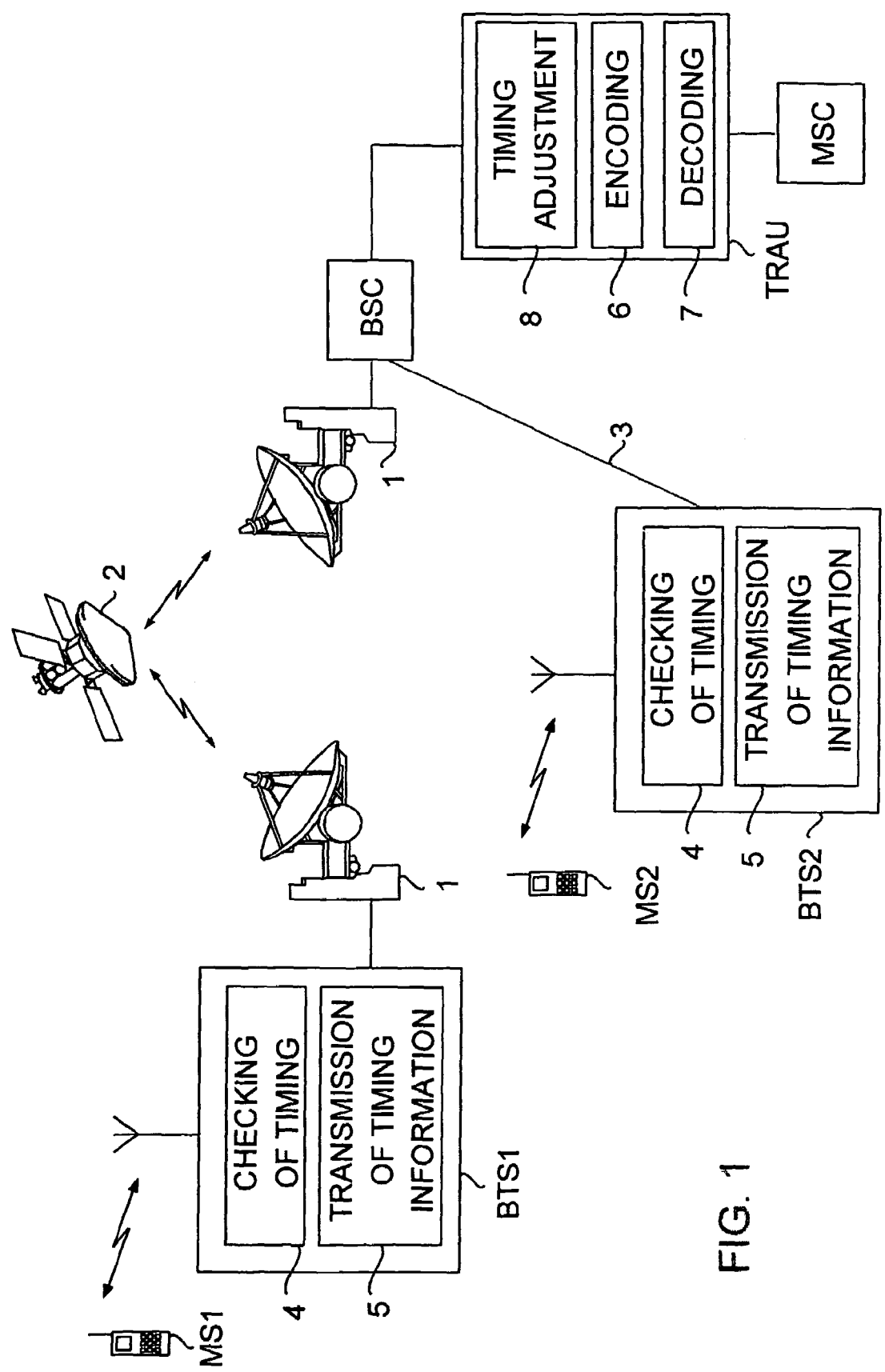

| INFORMATION ELEMENT | REFERENCE | PRESENCE | FORMAT | LENGTH |
|---|---|---|---|---|
| Message discriminator | 9.1 | M | V | 1 |
| Message type | 9.2 | M | V | 1 |
| Channel number | 9.3.1 | M | TV | 2 |
| Activation Type | 9.3.3 | M | TV | 2 |
| Channel Mode | 9.3.6 | M | TLV | 8-9 |
| Channel Identification | 9.3.5 | O 7) | TLV | 8 |
| Encryption information | 9.3.7 | O 1) | TLV | >=3 |
| Handover Reference | 9.3.9 | C 2) | TV | 2 |
| BS Power | 9.3.4 | O 3) | TV | 2 |
| MS Power | 9.3.13 | O 3) | TV | 2 |
| Timing Advance | 9.3.24 | C 3) 4) | TV | 2 |
| BS Power Parameters | 9.3.32 | O 5) | TLV | >=2 |
| MS Power Parameters | 9.3.31 | O 5) | TLV | >=2 |
| Physical Context | 9.3.16 | O 6) | TLV | >=2 |
| SACCH Information | 9.3.29 | O 8) | TLV | >=3 |
| UIC | 9.3.50 | C 9) | TLV | 3 |
| Time alignment | | O | TLV | 3 |

FIG. 2

METHOD FOR CONTROLLING A TRANSCODER OF A MOBILE COMMUNICATION SYSTEM

The present invention relates to a method for controlling the operation of a transcoder of a mobile communication system, in which system the transcoder is connected to a base station by a telecommunication connection, whereby the transcoder receives from the base station frames containing speech parameters which it decodes into speech signals to be transmitted to a mobile services switching centre, and from the mobile services switching centre speech signals which it encodes into speech parameters to be transmitted to the base station in the frames. The invention further relates to a mobile communication system comprising a mobile services switching centre, a base station and a transcoder for transmitting telecommunication signals between the mobile services switching exchange and the base station, and in which system: the base station is connected to the transcoder by a telecommunication connection, whereby the transcoder receives from the base station frames containing speech parameters which it decodes into speech signals to be transmitted to the mobile services switching centre, and from the mobile services switching centre speech signals which it encodes into speech parameters to be transmitted to the base station in the frames.

The present invention particularly relates to data transmission between a transcoder and a base station of the GSM mobile communication system (Global System for Mobile communications). It is to be noted, however, that the invention can also be applied to other corresponding mobile communication systems, although the invention will be described in the following with a particular reference to the GSM system.

A radio path in the GSM system is digital, and the frequency spectrum it requires depends on the transmission speed used on the radio path. The higher the transmission speed used on the radio path, the broader frequency spectrum it requires. Hence, the speech encoding of a fixed PSTN/ISDN telephone network (Public Switched Telephone Network/Integrated Services Digital Network), by means of which digital encoded data is transmitted 64 kbit/s for each traffic channel, is not suitable to be used on the radio path in the GSM system. Consequently, instead of the fixed network speech encoding, a RPE-LTP (Regular Pulse Excitation—Long Term Prediction) speech encoding is used on the radio path in the GSM system.

In the GSM system, a transcoder TRAU (Transcoder Rate Adaptor Unit) is arranged between a base station and a mobile services switching centre, in which transcoder the necessary speech encoding and speed adjustment attributes are centralized, whereby speech parameters received by the base station from the radio path and transmitted to the transcoder can be decoded into speech signals to be transmitted to the mobile services switching centre. Correspondingly, the speech signals received from the mobile services switching centre can be encoded into speech parameters to be transmitted to the base station. The transcoder interfaces are 64 kbit/s towards the mobile services switching centre and 8 or 16 kbit/s towards the base station.

In the known GSM systems, usually 2 Mbit/s circuit-switched PCM (Pulse Code Modulation) connections, by means of which speech parameters are transmitted in TRAU frames according to GSM specification sections 08.60 and 08.61, are used between a base station and a transcoder unit.

In the downlink direction, the base station thus receives TRAU frames that are 320 bits in length and whose length in time is 20 ms. Not until the base station has received a whole TRAU frame can the base station forward it on the radio path. Since the GSM system is time divisional (TDMA, Time Divisional Multiple Access), the contents of a TRAU frame associated with a particular call cannot be transmitted to the radio path at any time, but only in a time slot allocated to the particular call. Hence, a need exists to synchronize the point of time when the base station has received the whole TRAU frame from the transcoder with the point of time when the base station transmits it to the radio path. Optimally, the base station can send the contents of the TRAU frame to the radio path immediately when the whole TRAU frame has been received.

In the GSM system, the synchronization of TRAU frames is implemented in such a manner that the base station constantly monitors the need to adjust the timing of the TRAU frames it has received and indicates the adjustment need to the transcoder by the timing adjustment bits of the TRAU frames to be transmitted in the uplink direction. The transcoder, in turn, adjusts the transmission moment of the TRAU frame to be transmitted in the downlink direction. A disadvantage of this known solution is that if the transmission delay for transmitting information from the transcoder to the base station becomes long, the adjustment algorithm of the base station becomes unstable, no longer being able to find out a correct adjustment need; nor can the base station correctly indicate the need to adjust the timing to the transcoder. Consequently, the information on the adjustment need sent to the transcoder by the base station can be so incorrect that the synchronization of the TRAU frames increasingly deteriorates.

An object of the present invention is to eliminate the above problem and provide a solution by which the operation of a transcoder, and particularly its cooperation with a base station, in a mobile communication network can be controlled as simply as possible and exploiting resources as efficiently as possible. This object can be achieved by the method of the invention, which is characterized by transmitting to the base station predetermined control information which makes the base station to control the operation of the transcoder by said telecommunication connection.

The invention is based on the idea that when the transcoder is controlled by the base station, a situation can be avoided in which control information should be sent separately to the transcoder and the base station. In accordance with the invention, the fact that a data transmission connection exists between the base station and the transcoder can be utilized to transmit control information between them, whereby the need to transmit respective control information directly to the base station and the transcoder separately can be eliminated.

The invention further relates to a mobile communication system to which the method of the invention can be applied. The mobile communication system of the invention is characterized in that the mobile communication system comprises control means for transmitting predetermined control information to the base station, and that the base station is arranged to control the operation of the transcoder by said telecommunication connection in response to the reception of the control information.

In a preferred embodiment of the mobile communication system of the invention, the transcoder comprises adjustment means for adjusting the transmission moment of the frames to be transmitted to the base station in response to the information indicating the need for adjustment received from the base station. The base station further comprises checking means for checking the timing of the frames received from the transcoder by the telecommunication connection, and means for transmitting the information indicating the need to adjust the timing to the transcoder. The base station is arranged to control the operation of the transcoder by stopping the transmission of the information indicating the need to adjust the timing of the received frames to the transcoder in response to the reception of the control information.

This embodiment enables the adjustment means of the transcoder to be deactivated, in other words they no longer perform timing adjustment, with no need to send separate control commands directly to the transcoder. In this preferred embodiment of the invention it is sufficient to transmit the control information to the base station, whereby the base station is responsible for controlling the transcoder. The embodiment is extremely advantageous in situations involving a risk that the timing information transmitted by the base station is totally incorrect. An unnecessary delay on account of incorrect timing information in the transmission of the frames associated with the call to the subscriber can thus be avoided. The fact that the base station can be controlled by the control information enables the same transcoder to be utilized on a plurality of connections, whereby the transmission of the timing information is activated/deactivated by sending the control information to the base station used at a given time. Hence, the same transcoder can be utilized on a connection formed via a satellite, for example, on which the transmission delay is typically so long that the transmission of timing information should be prevented, and on a connection formed via a cable, when timing information should be transmitted. Furthermore, the base stations can be identical, in other words a base station which communicates with a base station controller via a satellite connection can correspond to a base station which is connected to the base station controller by a cable, since the transmission of timing information can be deactivated by transmitting the control information to the base station.

In another preferred embodiment of the mobile communication system of the invention, the mobile communication system is a GSM system, whereby the control means which consist of a base station controller are arranged to transmit the control information to the base station in connection with a CHANNEL_ACTIVATION message according to part 08.58 of the GSM specifications. The control information can thus be transmitted to the base station in connection with other necessary information, and the base station activates or deactivates for the particular connection the transmission of the timing information to the transcoder on account of the control information included in the CHANNEL_ACTIVATION message.

The preferred embodiments of the method and mobile communication system of the invention are disclosed in the attached dependent claims 2 to 4 and 6 to 10.

The invention will be described in closer detail in the following by way of example with reference to the accompanying drawings, in which FIG. 1 is a block diagram of a first preferred embodiment of the mobile communication system in accordance with the invention, and FIG. 2 is a table of the contents of a CHANNEL_ACTIVATION message of part 08.58 of the GSM specifications.

FIG. 1 is a block diagram of a first preferred embodiment of the mobile communication system in accordance with the invention. The mobile communication system of FIG. 1 can be a GSM system, for example.

A base station BTS1 shown in FIG. 1 communicates with a base station controller BSC via earth stations 1 and a satellite 2. A base station BTS2, in turn, communicates with the same base station controller BSC via a cable 3.

When a connection from a mobile services switching centre MSC to a mobile station MS2 is active, an encoder 6 of a remote transcoder TRAU encodes the speech signals received from the mobile services switching centre MSC in the downlink direction into speech parameters which it arranges in the TRAU frames and transmits to the base station BTS2 via the base station controller BSC. The base station BTS2, in turn, waits until it has received a whole TRAU frame, whereupon it transmits the frame over the radio path to the mobile station MS2 in a time slot allocated to the frame. In order to decrease the length of the delay of a call in progress to the mobile station MS2 as much as possible, the reception of the TRAU frame in the base station should be synchronized with the forwarding of the contents of the TRAU frame on the radio path. In the GSM system, this has been implemented in such a manner that the base station BTS2 comprises checking means 4 of timing which measure the time elapsed between the point of time when the TRAU frame has been received and the point of time when the speech parameters included in the TRAU frame can be forwarded on the radio path. On the basis of this measurement, transmission means 5 of timing information of the base station BTS2 add to the TRAU frames to be transmitted in the uplink direction the information on how the timing of the TRAU frames transmitted by the transcoder TRAU should be adjusted.

A decoder 7 of the transcoder TRAU, in turn, decodes the speech parameters received from the base station BTS2 into speech signals to be transmitted to the mobile services switching centre MSC. Furthermore, a timing adjustment unit 8 of the transcoder TRAU detects the timing information included in the TRAU frames received by the transcoder and, on account of this, adjusts the timing of the TRAU frames associated with the call and to be transmitted to the base station BTS2 in the downlink direction.

When, on the other hand, a connection is being set up from the mobile services switching centre MSC of FIG. 1 to the mobile station MS1, the base station controller BSC detects that the transmission delay of the connection is too long for the base station BTS1 to be able to transmit correct timing information to the transcoder TRAU as described above. In practice, the transmission delay for transmitting information from the transcoder to the base station should not exceed about 10 ms to enable the base station to transmit correct timing information to the transcoder. However, the transmission delay of the connection established via the satellite 2 from the transcoder TRAU to the base station BTS1 is about 250 ms, in other words it is too long. Consequently, the base station controller BSC transmits, in accordance with the invention, control information to the base station BTS1 in connection with the CHANNEL_ACTIVATION message defined in part 08.58 point 8.4.1 of the GSM specifications. The control information deactivates the transmission means 5 of timing information of the base station BTS1. The information can comprise, for example, a TIME ALIGNMENT element which can be 3 bits in length, for example, and which has been added to the end of the CHANNEL_ACTIVATION message.

When the base station BTS1 receives the TIME ALIGNMENT element in connection with the CHANNEL_ACTIVATION message, it detects that for the connection no information concerning the need for adjustment is transmitted to the transcoder TRAU, and it deactivates the transmission unit 5 of timing information. In future, the base station will thus receive TRAU frames from the transcoder which are not synchronized with the point of time when their contents are transmitted to the radio path. Consequently, the contents of the TRAU frames must most probably be buffered for a while until being transmitted to the radio path. If, on the other hand, no TIME ALIGNMENT element is included in the CHANNEL_ACTIVATION message, the transmission unit 5 of timing information is activated in the usual way.

The base station controller BSC can add a TIME ALIGNMENT element to the CHANNEL_ACTIVATION message to all connections established over a specific base station, for example. In other words, if the base station communicates with the transcoder via a satellite connection, the base station controller can automatically add the TIME ALIGNMENT element to all CHANNEL_ACTIVATION messages to be transmitted to the base station.

FIG. 2 is a table of the contents of a CHANNEL_ACTIVATION message of part 08.58 of the GSM specifications. In accordance with the invention, one optional element, in other words a TIME ALIGNMENT element which is 3 bits in length, has been added to the message. If the element is included in the message, the base station stops transmitting information indicating the need for adjustment to the transcoder. If, on the other hand, no such element is included in the message, the base station operates normally, in other words it transmits information indicating the need for adjustment to the transcoder.

It is to be understood that the description above and the accompanying drawings are only intended to illustrate the present invention. It will be obvious to those skilled in the art that the invention can be varied and modified in many ways without departing from the scope and spirit of the invention disclosed in the attached claims.

The invention claimed is:

1. A method for controlling the operation of a transcoder of a mobile communication system, in which system the transcoder is connected to a base station by a telecommunication connection, the method comprising:
    the transcoder receiving, from the base station, frames containing speech parameters, which the transcoder decodes into speech signals to be transmitted to a mobile services switching centre,
    the transcoder receiving, from the mobile services switching centre, speech signals which the transcoder encodes into speech parameters to be transmitted to the base station in frames,
    the base station monitoring a need to adjust timing of the frames received from the transcoder and indicating a transmission moment timing adjustment need to the transcoder by transmitting information indicating the adjustment need to the transcoder,
    the transcoder adjusting a transmission moment in response to the adjustment need indicated by the base station,
    defining a limit for a longest transmission delay allowed between the transcoder and the base station, and
    when the transmission delay exceeds the limit transmitting to the base station, predetermined control information, which controls the base station to stop the indication of the adjustment need to the transcoder such that the transcoder stops adjustment of the transmission moment of the frames to be transmitted to the base station.

2. The method of claim 1, wherein the mobile communication system is a GSM system, the frames received by the base station from the transcoder are TRAU frames, and the control information is transmitted to the base station in connection with a CHANNEL_ACTIVATION message according to part 08.58 of the GSM specifications.

3. A mobile communication system comprising:
    a mobile services switching centre,
    a base station, and
    a transcoder for transmitting telecommunication signals between the mobile services switching exchange and the base station, and in which system, the base station is connected to the transcoder by a telecommunication connection, wherein
    the transcoder receives, from the base station, frames containing speech parameters which the transcoder decodes into speech signals to be transmitted to the mobile services switching centre, and the transcoder receives, from the mobile services switching centre, speech signals which the transcoder encodes into speech parameters to be transmitted to the base station in frames,
    the transcoder includes adjustment means for adjusting transmission moments of the frames to be transmitted to the base station in response to information indicating a need for adjustment received from the base station, and
    the base station includes checking means for checking timing of the frames received from the transcoder by the telecommunication connection by measuring time elapsed between a point of time when a whole frame has been received from the transcoder and a point of time when the base station transmits contents of the frame to a radio path, and means for transmitting the information indicating the need to adjust the transmission moment timing to the transcoder,
    the mobile communication system further comprising control means for transmitting predetermined control information to the base station when said time measured by the base station exceeds a predetermined limit, and wherein the base station is arranged to control operation of the transcoder via the telecommunication connection by stopping the transmission of the information indicating the need to adjust the timing of the received frames to the transcoder in response to the reception of the control information.

4. The mobile communication system of claim 3, wherein the control means include a base station controller.

5. The mobile communication system of claim 3, wherein the mobile communication system is a GSM system, the frames transmitted by the transcoder are TRAU frames, and the control means are arranged to transmit the control information to the base station in connection with a CHANNEL_ACTIVATION message according to part 08.58 of the GSM specifications.

6. The mobile communication system of claim 3, wherein the control means are arranged to transmit the control information to the base station when the transmission connection between the base station and the transcoder is at least partly formed by a satellite connection.

* * * * *